United States Patent
Yamamoto

(10) Patent No.: US 8,035,900 B2
(45) Date of Patent: Oct. 11, 2011

(54) OBJECTIVE LENS FOR ENDOSCOPE

(75) Inventor: Chikara Yamamoto, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 12/787,317

(22) Filed: May 25, 2010

(65) Prior Publication Data

US 2010/0232033 A1    Sep. 16, 2010

Related U.S. Application Data

(62) Division of application No. 11/606,086, filed on Nov. 30, 2006, now Pat. No. 7,764,437.

(30) Foreign Application Priority Data

Dec. 1, 2005 (JP) ............................. P2005-347817

(51) Int. Cl.
G02B 15/14 (2006.01)
(52) U.S. Cl. .................. 359/676; 359/809; 600/168
(58) Field of Classification Search .................. 359/432, 359/676, 809; 600/168
See application file for complete search history.

(56) References Cited

U.S. PATENT DOCUMENTS

| 5,245,475 A | * | 9/1993 | Takasugi ............ 359/690 |
| 6,353,504 B1 | | 3/2002 | Yamamoto |
| 2006/0084841 A1 | | 4/2006 | Minami |

FOREIGN PATENT DOCUMENTS

| DE | 102 21 401 A1 | 11/2002 |
| JP | 2876252 B2 | 1/1999 |
| JP | 2001-91832 A | 4/2001 |

* cited by examiner

Primary Examiner — Joseph P Martinez
(74) Attorney, Agent, or Firm — Birch, Stewart, Kolasch & Birch, LLP

(57) ABSTRACT

An objective lens for an endoscope is provided and has a lens group A and a lens group B that are movable in a direction of an optical axis. In the objective lens, first focal adjustment for observing a point between a most-distant point and an intermediate point is performed by moving the lens group A from a lens arrangement for observing the most-distant point; and second focal adjustment for observing a point between the intermediate point to a nearest point is performed by moving the lens group B from a lens arrangement for observing the intermediate point.

6 Claims, 7 Drawing Sheets

OBJECTIVE LENS FOR ENDOSCOPE

This application is a Divisional of application Ser. No. 11/606,086, filed on Nov. 30, 2006, now U.S. Pat. No. 7,764,437 the entire contents of which are hereby incorporated by reference and for which priority is claimed under 35 U.S.C. §120; and this application claims priority of Application No. JP2005-347817 filed in Japan on Dec. 1, 2005 under 35 U.S.C. §119.

BACKGROUND OF THE INVENTION

1. Field of the Invention

The present invention relates to an objective lens to be provided at a tip of an endoscope, and more particularly to an objective lens for an endoscope (hereinafter, sometimes referred to as "endoscopic objective lens") capable of performing focal adjustment (hereinafter, sometimes referred to as "focusing"), by moving part of the system lenses, in states from a state suited for observing an object in its entirety (hereinafter, referred to as "distant-side observation state") to a state suited for observing, with magnification, a part of the object (hereinafter, referred to as "a nearside magnifying observation state").

2. Description of Related Art

As for the endoscopic objective lenses of this kind, there are known those described in Japanese Patent No. 2876252 and JP-A-2001-91832.

The endoscopic objective lens, described in Japanese Patent No. 2876252, is arranged with four groups whose refractive powers are negative, positive, negative and positive in order from the object side. By moving the third group along the optical axis, focal adjustment can be performed from a distant-side observation state to a nearside magnifying observation state. By virtue of the lens groups movable in position, observation is available not only at the both ends for the most-distant and nearest points but also at the intermediate region between the both ends.

Meanwhile, the endoscopic objective lens, described in JP-A-2001-91832, is arranged with four groups whose refractive powers are negative, positive, negative and positive in order from the object side. By moving the second and third groups or the third and fourth groups along the optical axis, focal adjustment can be performed from a distant-side observation state to a nearside magnifying observation state. Furthermore, the magnification of the lens in use can be desirably changed in the intermediate region between the both ends for the most-distant and nearest points.

However, in the endoscopic objective lenses described in Japanese Patent No. 2876252 and JP-A-2001-91832, the observing magnification greatly changes upon focusing in the nearside magnifying observation state. Thus, the subject to be observed (i.e., the object) is ready to be placed out of the field of view. For the endoscopic objective lens, it is considerably difficult to perform focal adjustment where the observing magnification changes greatly, because the depth of observation (the depth of field) is narrow in the nearside magnifying observation state.

SUMMARY OF THE INVENTION

An object of an illustrative, non-limiting embodiment of the invention is to provide an endoscopic objective lens capable of easily performing focal adjustment with a small change of observation magnification upon performing the focal adjustment in the nearside magnifying observation state.

According to one aspect of the invention, a focal adjustment at a point between the most-distant point and an intermediate point and a focal adjustment at a point between the intermediate point and the nearest point are performed by means of respective lenses different from each other.

Namely, an endoscopic objective lens according to one aspect of the invention includes: a lens group A and a lens group B that are movable in a direction of an optical axis, wherein first focal adjustment for observing a point between a most-distant point and an intermediate point is performed by moving the lens group A from a lens arrangement for observing the most-distant point; and second focal adjustment for observing a point between the intermediate point to a nearest point is performed by moving the lens group B from a lens arrangement for observing the intermediate point.

In one aspect of the invention, the endoscopic objective lens preferably satisfies conditional expressions (1) and (2) given below:

$$1.2 < f_M/f_F \quad (1)$$

$$0.9 < |f_N/f_M| < 1.1 \quad (2)$$

where $f_M$: focal length of the endoscopic objective lens (the entire system) in observing the intermediate point, $f_F$: focal length of the endoscopic objective lens (the entire system) in observing the most-distant point, and $f_N$: focal length of the endoscopic objective lens (the entire system) in observing the nearest point.

A lens constituting the lens group A and a lens constituting the lens group B may not overlap each other. In this case, the lens group B can be constituted by one cemented lens.

Meanwhile, the lens group A can be constituted by one group. On the other hand, the lens group A can be arranged with two groups that are a lens group having a positive refractive power and a lens group having a negative refractive power so that the two groups can take respective moving paths different from each other during the first focal adjustment.

Meanwhile, in one aspect of the invention, the endoscopic objective lens can further includes a lens group C in a position closest to an object, the lens group C being fixed during the first and second focal adjustments, wherein the objective lens satisfies conditional expressions (3) to (5) given below:

$$1.2 < f_M/f_F < 2.5 \quad (3)$$

$$4.0 < D_F/f_F < 15.0 \quad (4)$$

$$2.0 < |\beta_{CN}/\beta_{CF}| < 8.0 \quad (5)$$

where $D_F$: a length of the endoscopic objective lens (the entire system) in observing the most-distant point (geometric distance from an object-side surface of the lens arranged closest to the object to an image-side surface of the lens arranged closest to the image side), $\beta_{CN}$: a magnification of the lens group C in observing the nearest point, and $\beta_{CF}$: a magnification of the lens group C in observing the most-distant point.

Meanwhile, in one aspect of the invention, the endoscopic objective lens can include: a first lens group having a negative refractive power; a second lens group having a positive refractive power; a third lens group having a negative refractive power; a fourth lens group having a positive refractive power; and a fifth lens group having a positive refractive power, that are arranged in order from the object side, wherein the lens group A is constituted by the third lens group, and the lens group B is constituted by the fifth lens group.

Meanwhile, in one aspect of the invention, the endoscopic objective lens can include: a first lens group having a negative refractive power; a second lens group having a positive refractive power; a third lens group having a negative refractive power; a fourth lens group having a positive refractive power; and a fifth lens group having a positive refractive power, that are arranged in order from the object side, wherein the lens group A is constituted by the second and third lens groups, and the lens group B is constituted by the fifth lens group.

Meanwhile, preferably, an auto-focus mechanism is further provided for automating the second focal adjustment.

Note that "the most-distant point" means the most distant point among points in a distance from the objective lens to an object, while "the nearest point" means the nearest point thereof. Meanwhile, "the intermediate point" signifies a point located between the most-distant point and the nearest point wherein not necessarily meant a center point of between the most-distant point and the nearest point.

BRIEF DESCRIPTION OF THE DRAWINGS

The features of the invention will appear more fully upon consideration of the exemplary embodiment of the invention, which are schematically set forth in the drawings, in which.

DETAILED DESCRIPTION OF THE EXEMPLARY EMBODIMENTS

Although the invention will be described below with reference to the exemplary embodiments thereof, the following exemplary embodiments and modifications do not restrict the invention.

According to an exemplary embodiment, the first focal adjustment, for an observation point in a range from a most-distant point to an intermediate point, is performed by moving the lens group A from a lens arrangement of observing the most-distant point, while second focal adjustment, for an observation point in a range from the intermediate point to a nearest point, is performed by moving the lens group B from a lens arrangement of observing the intermediate point. This makes it possible to reduce the change of observing magnification during performing a focal adjustment in the nearside magnifying observation state, thus facilitating the focal adjustment.

With using the drawings, explanation is now made on an endoscopic objective lens according to two exemplary embodiments of the present invention.

Figure 1:
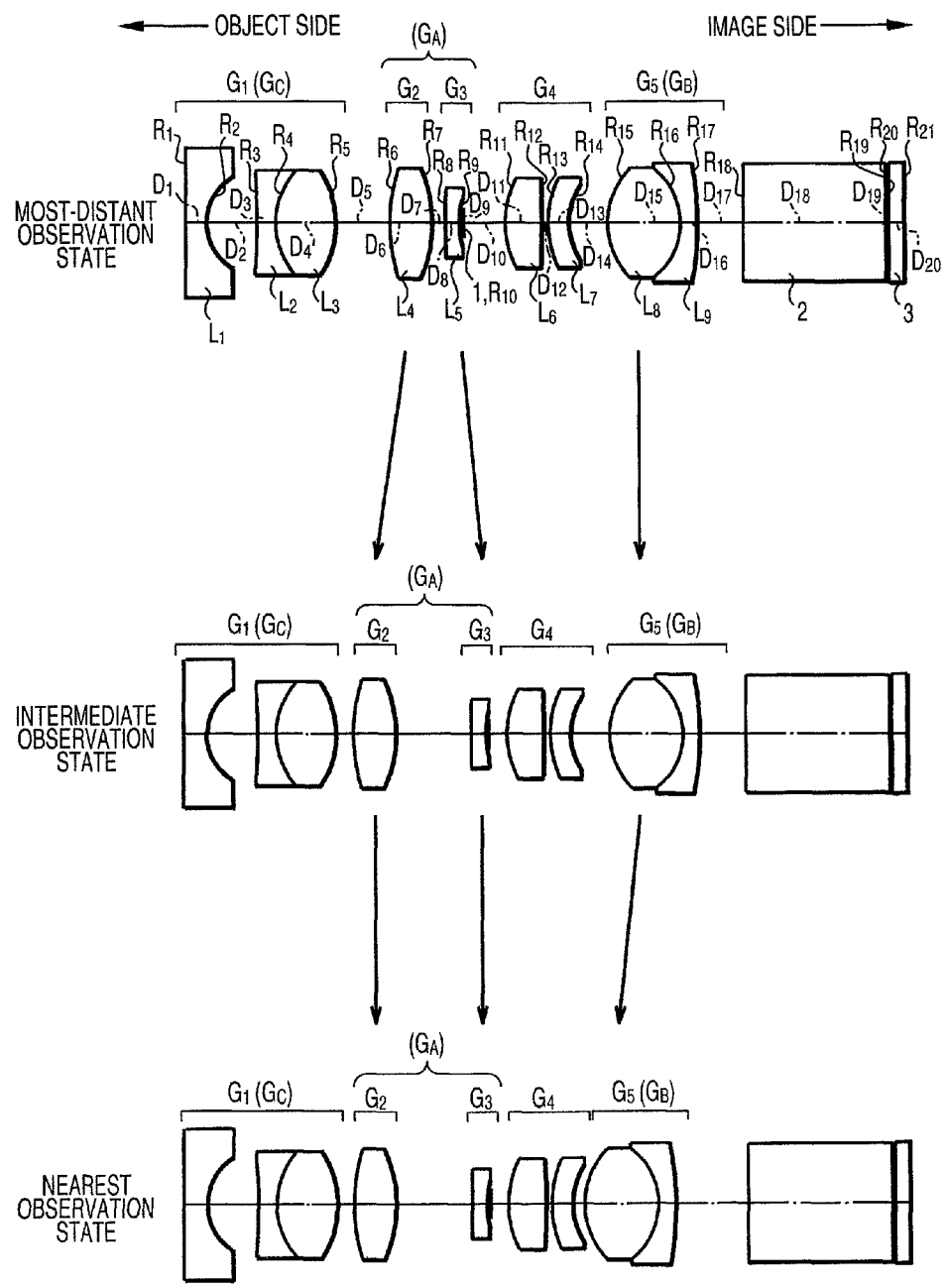
FIG. 1 is a view showing an endoscopic objective lens according to an exemplary example 1 of the present invention.

With FIG. 1, explanation is first made on an endoscopic objective lens according a first exemplary embodiment. FIG. 1 shows a basic arrangement of an endoscopic objective lens according to an example 1 of the invention. Incidentally, in FIG. 1, the optical axis is shown by a one-dot chain straight line extending in a left-right direction. Meanwhile, in FIG. 1, the most-distant observation state is shown with a lens arrangement for observing the most distant point (focal adjustment is for the most distant point). The intermediate observation state refers to a lens arrangement to observe the intermediate point (focal adjustment is for the intermediate point), while the nearest observation state refers to a lens arrangement to observe the nearest point (focal adjustment is for the nearest point). This is the same as for those of FIGS. 2 and 3 respectively showing the lens basic arrangements of endoscopic objective lenses in example 2 and 4.

As shown in FIG. 1, an endoscopic objective lens includes, in order from the object side, a first lens group $G_1$ having a negative refractive power and being fixed, a second lens group $G_2$ having a positive refractive power and being movable along the optical axis, a third lens group $G_3$ having a negative refractive power and being movable along the optical axis, a fourth lens group $G_4$ having a positive refractive power and being fixed, and a fifth lens group $G_5$ having a positive refractive power and being movable along the optical axis.

In this endoscopic objective lens, a lens group A ($G_A$) is constituted by two lens groups of the second and third lens groups $G_2$, $G_3$. Where an object lies between the most-distant point and the intermediate point, first focal adjustment can be performed by simultaneously moving the second lens group $G_2$ toward the object along the optical axis and the third lens group $G_3$ toward the image along the optical axis from the respective positions in the most-distant observation state shown in the upper in FIG. 1 such that the respective moving paths are different from each other.

In this endoscopic objective lens, a lens group B ($G_B$) is constituted by only the fifth lens group $G_5$. In the near-side magnifying observation state in which the observation point is in a range of from an intermediate point to the nearest point, second focal adjustment is performed by moving the fifth lens group G5 toward the object along the optical axis from the intermediately observation state shown in the middle of FIG. 1.

Figure 2:
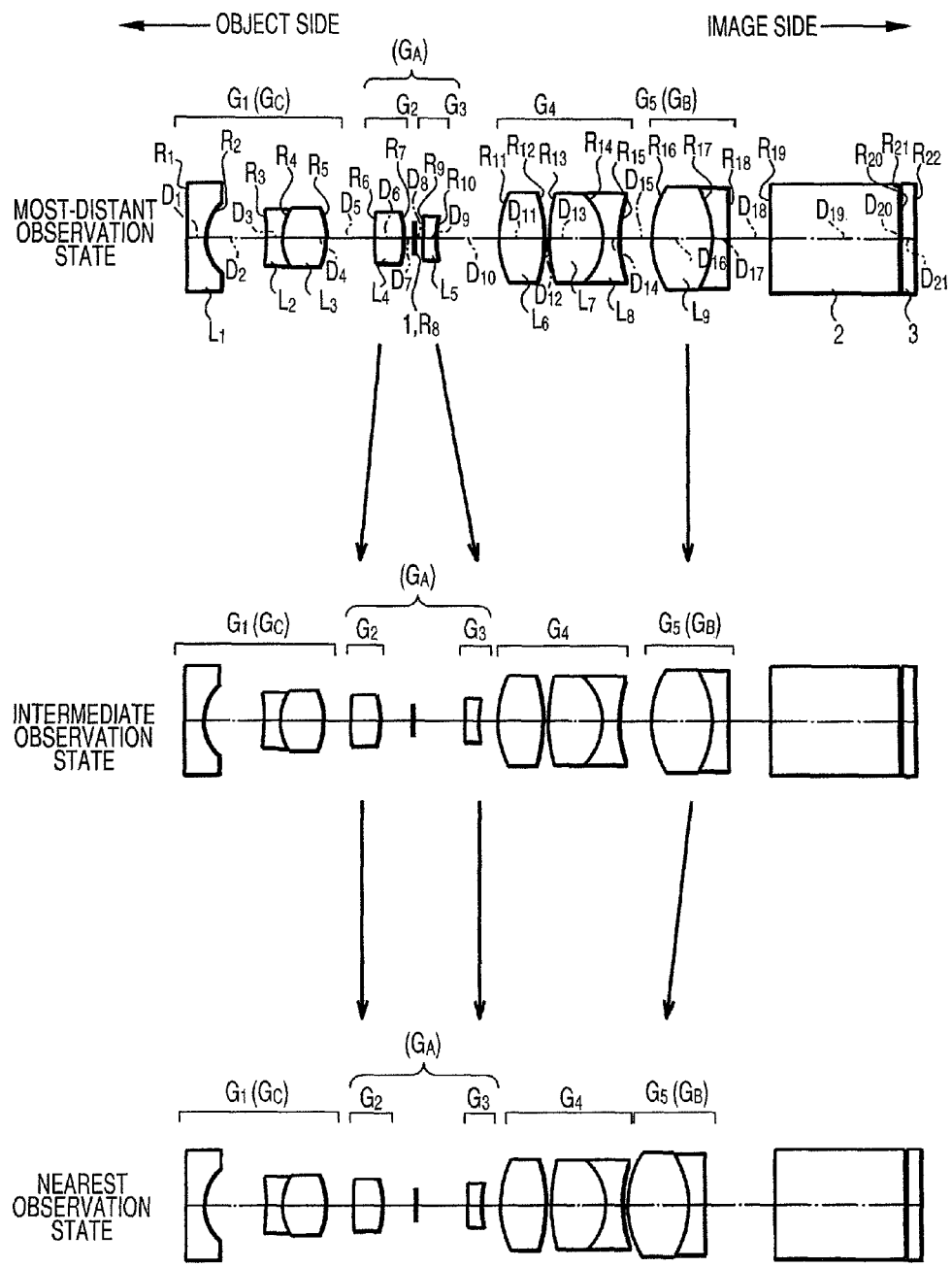
FIG. 2 is a view showing an endoscopic objective lens according to an exemplary example 2 of the present invention.
Figure 3:
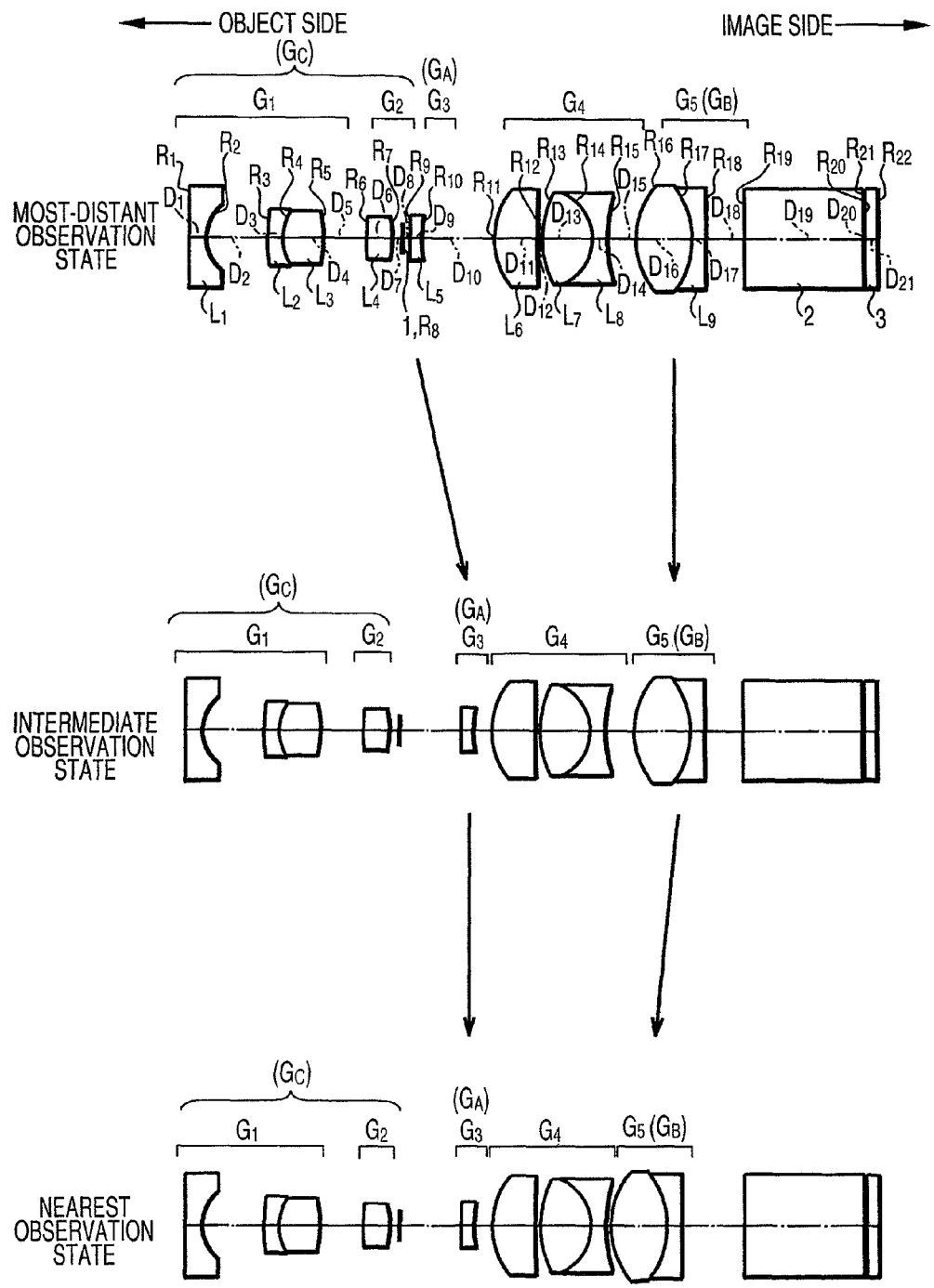
FIG. 3 is a view showing an endoscopic objective lens according to an exemplary example 4 of the present invention.
Figure 4:
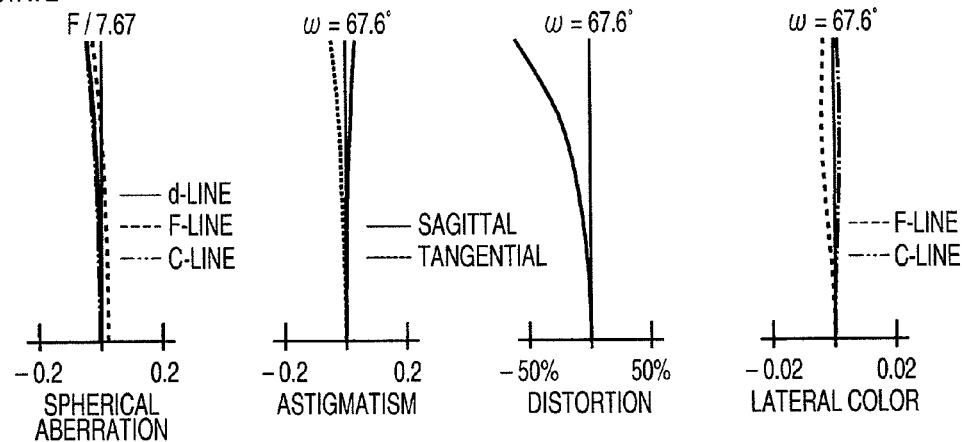
FIG. 4 shows aberration diagrams of an endoscopic objective lens according to an exemplary example 1 of the present invention.
Figure 4:
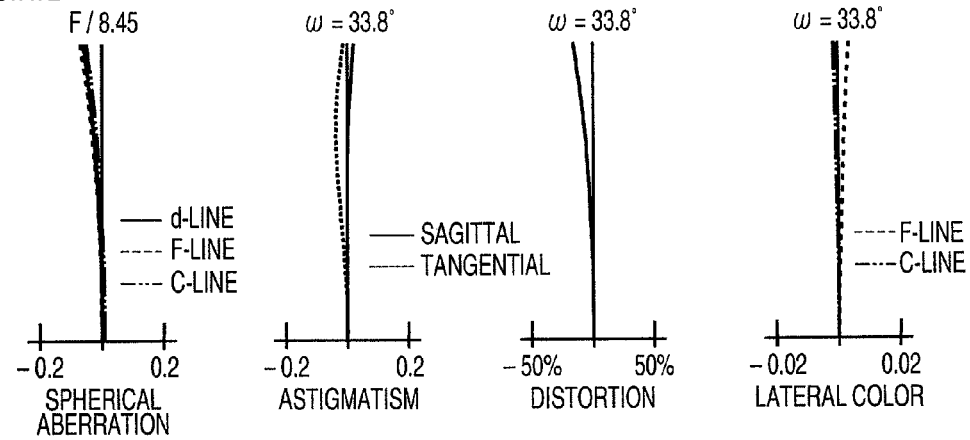
Figure 4:
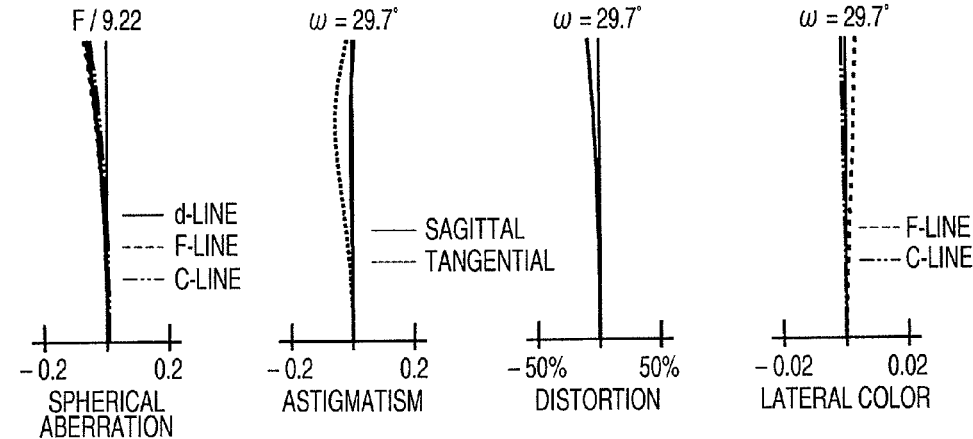
Figure 5:
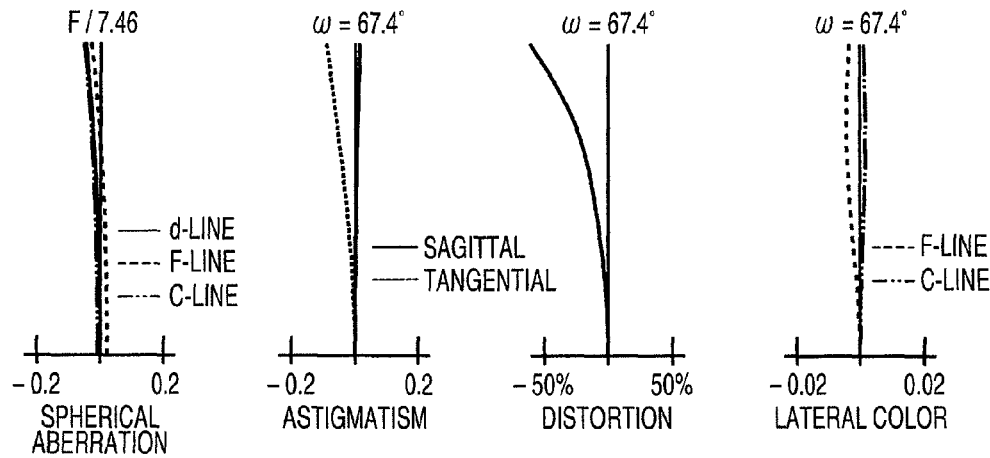
FIG. 5 shows aberration diagrams of an endoscopic objective lens according to an exemplary example 2 of the present invention.
Figure 5:
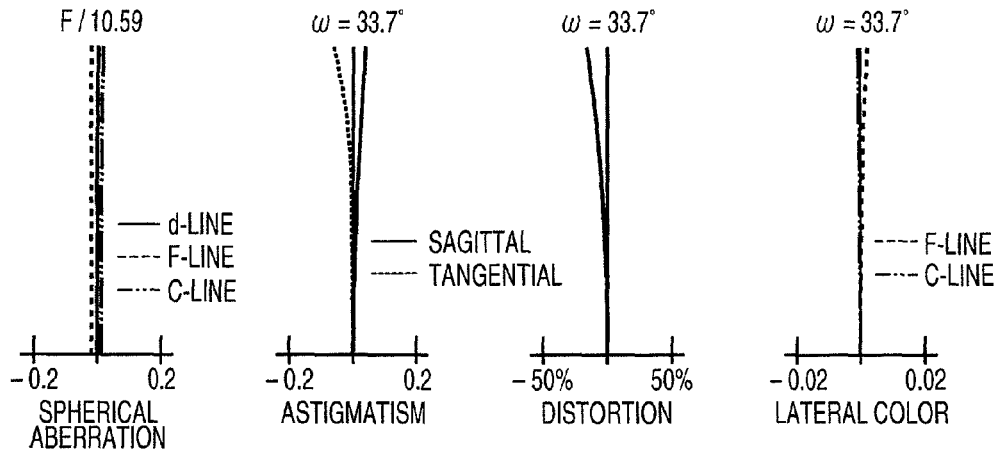
Figure 5:
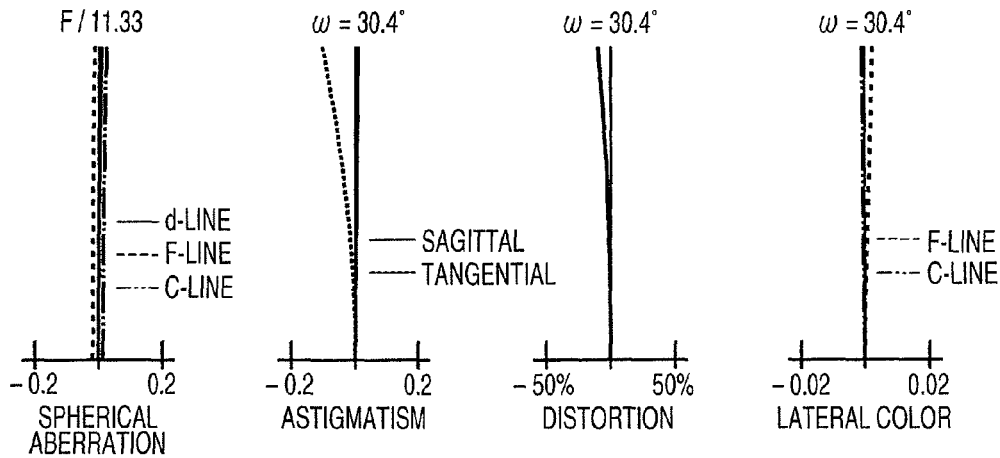
Figure 6:
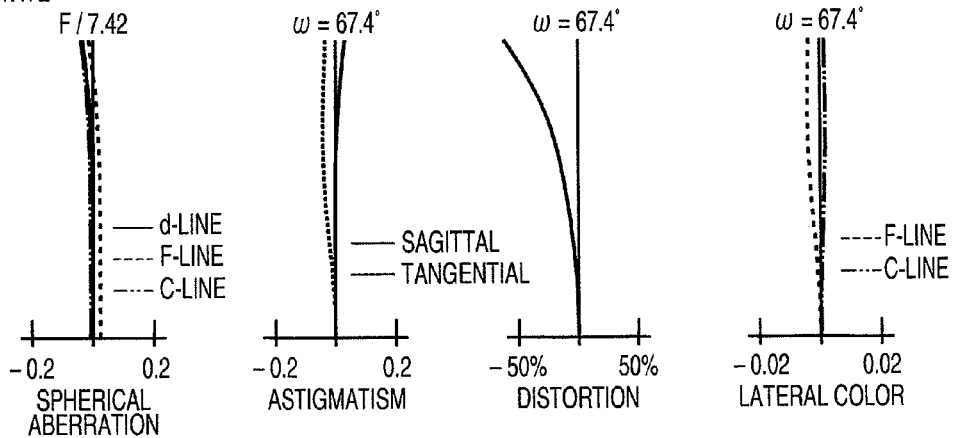
FIG. 6 shows aberration diagrams of an endoscopic objective lens according to an exemplary example 3 of the present invention.
Figure 6:
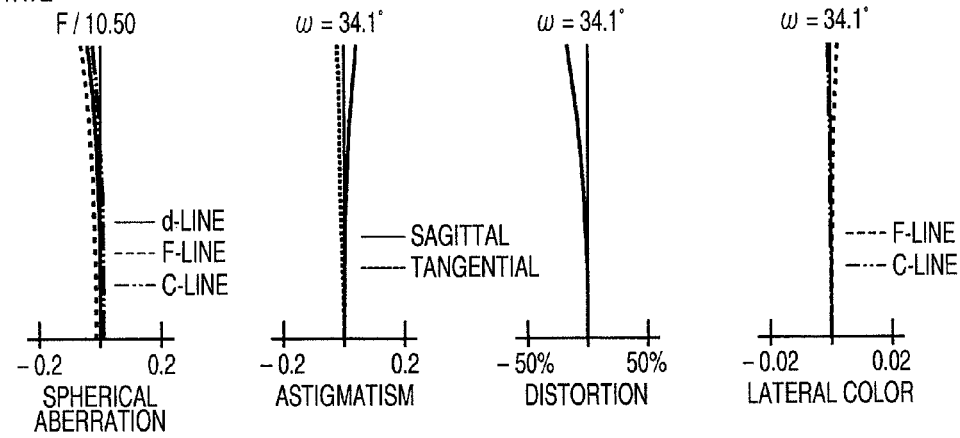
Figure 6:
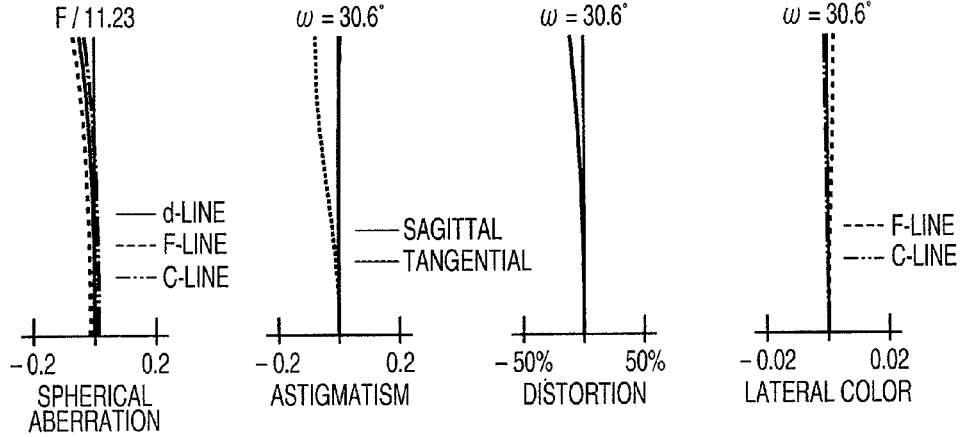
Figure 7:
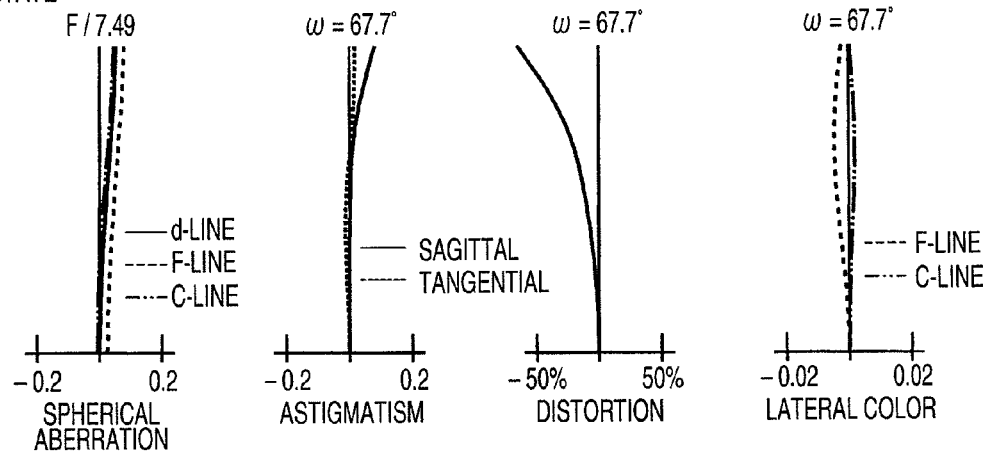
FIG. 7 shows aberration diagrams of an endoscopic objective lens according to an exemplary example 4 of the present invention.
Figure 7:
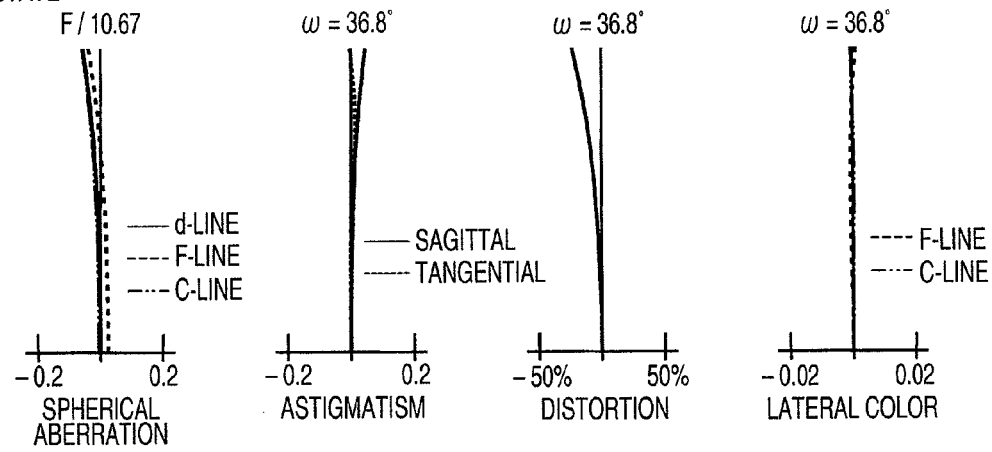
Figure 7:
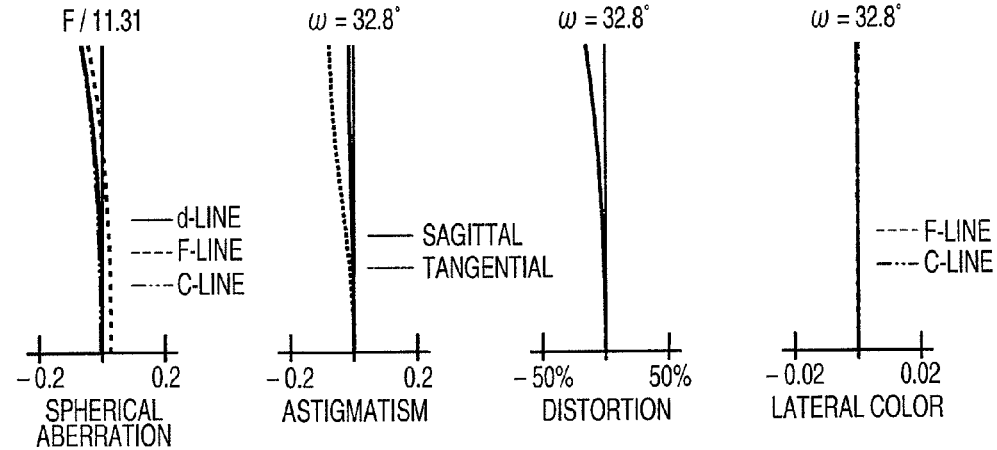

Incidentally, the distant-side observation state means a state suited for an observation in which the distance to the object is great, the angle of view is wide and the range is broad. Meanwhile, the nearside observation state means a state suited for an observation in which the distance to the object is small and magnification is partially done. Meanwhile, the most-distant observation state is a state in which the magnification on the entire system is rendered the smallest in the distant-side observation state. On the other hand, the nearest observation state is a state in which the magnification on the entire system is rendered the greatest in the nearside magnifying observation state. This is the same as for those of FIGS. 2 and 3 showing the basic arrangements of endoscopic objective lenses of examples 2 and 4.

Between the third and fourth lens groups $G_3$ and $G_4$ of the endoscopic objective lens, an aperture stop 1 is arranged to move together with the third lens group $G_3$ during the first focal adjustment. Meanwhile, there are arranged a path-change prism 2 and a cover glass 3, on the image side of the fifth lens group $G_5$. On the image side of the cover glass 3, a CCD device and an image-guide fiber, not shown, are arranged to covey image information. In FIG. 1, the aperture stop 1 is arranged contacted on the object side of the third lens group $G_3$. During first focal adjustment, it can be moved together with the third lens group $G_3$ toward the image side.

In the endoscopic objective lens, a lens group C ($G_C$) is arranged closest to the object and formed by the first lens group that is fixed during first and second focal adjustment, thus satisfying conditional expressions (1), (2), (4) and (5) below.

$$1.2 < f_M/f_F \quad (1)$$

$$0.9 < |f_N/f_M| < 1.1 \quad (2)$$

$$4.0 < D_F/f_F < 15.0 \quad (4)$$

$$2.0 < \beta_{CN}/\beta_{CF} < 8.0 \quad (5)$$

where $f_M$: a focal length of the endoscopic objective lens in observing an intermediate point, $f_F$: a focal length of the endoscopic objective lens in observing the most distant point, $f_N$: a focal length of the endoscopic objective lens in observing the nearest point, $D_f$: a focal length of the endoscopic objective lens in observing the most distant point (geometric distance of from the object-side surface of the lens positioned closest to the object to the image-side surface of the lens positioned closest to the object), $\beta_{CN}$: a magnifying power of the lens group C in observing the nearest point, and $\beta_{CF}$: a magnifying power of the lens group C in observing the most distant point.

The conditional expression (1) preferably defines the upper limit as in the conditional expression (3) below, and hence provided to satisfy the conditional expression (3) for the FIG. 1 endoscopic objective lens.

$$1.2 < f_M/f_F < 2.5 \quad (3)$$

With FIG. 3, explanation is now made on an endoscopic objective lens according to a second exemplary embodiment of the present invention. FIG. 3 shows a basic arrangement of an endoscopic objective lens according to an exemplary example 4 of the invention.

As shown in FIG. 3, the endoscopic objective lens includes, in order from the object side, a first lens group $G_1$ having a negative refractive power and being fixed, a second lens group $G_2$ having a positive refractive power and being fixed, a third lens group $G_3$ having a negative refractive power and movable along the optical axis, a fourth lens group $G_4$ having a positive refractive power and being fixed, and a fifth lens group $G_5$ having a positive refractive power and movable along the optical axis.

In this endoscopic objective lens, a lens group A ($G_A$) is constituted by only the third lens groups $G_3$. The first focal adjustment in a distant-side observation state is performed by moving the third lens group $G_3$ toward the object along the optical axis from a position in the most-distant observation state shown in the upper in FIG. 3.

Meanwhile, in this endoscopic objective lens, a lens group B ($G_B$) is constituted by only the fifth lens group $G_5$. The second focal adjustment in a nearside magnifying observation state is performed by moving the fifth lens group $G_5$ toward the object along the optical axis from a position in the intermediately-observation state shown in the middle in FIG. 3.

Furthermore, the endoscopic objective lens is provided with an aperture stop 1 fixed between the second lens group $G_2$ and the third lens groups $G_2$, $G_3$. Meanwhile, a path-change prism 2 and a cover glass 3 are arranged on the image side of the fifth lens group $G_5$, similarly to the first embodiment. In a position closer to the image with respect to the cover glass 3, a CCD device and an image-guide fiber, not shown, are arranged to covey image information.

Meanwhile, in this endoscopic objective lens, a lens group C ($G_C$) is arranged in a position closest to the object, which is formed by the first and second lens groups $G_1$, $G_2$ that are fixed during the first and second focal adjustment, thus satisfying the conditional expressions (1) to (5) similarly to the first embodiment.

With the endoscopic objective lens structured like the first or second embodiment, the observing magnification can be reduced in change during the focal adjustment in a nearside magnifying observation state. Thus, focal adjustment is made easy to perform.

The conditional expression (1) defines the magnification change of the entire system caused by changing the focal length in the first focal adjustment. In the case lower than the lower limit thereof, when to obtain the same magnification, observation comes on a region where is not well illuminated with the light from the light guide. Meanwhile, it leads to a lowered magnification for the intermediate point.

The conditional expression (2) defines the magnification change of the entire system caused by changing the focal length in the second focal adjustment. In the case set up outside the range thereof, the observing magnification greatly changes during focal adjustment. This makes focal adjustment difficult to perform because the object is readily put out of the field of view.

The conditional expression (3) defines the upper-limit value not established in the conditional expression (1). In the case of exceeding the upper-limit value, the lenses have an increased amount of movement thus leading to a size increase of the entire lens system and hence an increased length at the tip of the endoscope. This results in an increased pain that the patient is to suffer or a difficult manipulation of the endoscope.

The conditional expression (4) defines the ratio of the length of the entire lens system in a most-distant observation state to the length of the entire lens system in the most-distant observation state. In the case of exceeding the upper-limit value, the endoscope increases in its tip thus resulting in an increased pain that the patient is to suffer or a difficult manipulation of the endoscope. Meanwhile, in the case of below the lower limit thereof, there is obtained a less space for the lens group to move during focal adjustment, thus delimiting to a narrow range the position where focal adjustment is available in observation.

The conditional expression (5) defines the ratio of the magnification of the lens group C ($G_C$) in the nearest observation state to that in the most-distant observation state. For the lens generally termed a zoom lens, the value corresponding to the conditional expression (5) results 1. For the endoscope according to one aspect of the invention, when shifted from the most-distant observation state into the nearest observation state, the distance to the object decreases as the nearest observation state is neared. This shows that the magnification is changed by utilization of the action that the object looks magnified. In the case of below the lower-limit value, the magnification is insufficient in the nearest observation state. Meanwhile, in the case of exceeding the upper limit thereof, the distance to the object is excessively near in the nearest observation state, thus resulting in an observation on a region where is not well illuminated with the light from the light guide.

Examples 1 to 4 of the invention will be explained in detail in the following.

Example 1

FIG. 1 shows a basic arrangement of an endoscopic object lens according to an example 1, in the states of most-distant observation, intermediate observation and nearest observation.

The endoscopic objective lens of the example 1 includes, in order from the object side, a first lens group $G_1$ having a negative refractive power and being fixed, a second lens group $G_2$ having a positive refractive power and movable along the optical axis, a third lens group $G_3$ having a negative refractive power and movable along the optical axis, a fourth lens group $G_4$ having a positive refractive power and being fixed, and a fifth lens group $G_5$ having a positive refractive power and movable along the optical axis, as explained in the first embodiment.

The first lens group $G_1$ is constituted by a first lens $L_1$ formed as a plane-concave lens whose concave surface is directed toward the image side, a second lens $L_2$ formed as a double-concave lens having an intense curvature in its image-side surface as compared to that in the object-side surface, and a third lens $L_3$ formed as a double-convex lens. The second lens $L_2$ and the third lens $L_3$ are joined together. As was explained in the first embodiment, a lens group C ($G_C$) in the example 1 is constituted by the first lens group $G_1$.

The second lens group $G_2$ is constituted by the one, fourth lens $L_4$ formed as double-convex lens while the third lens group $G_3$ is by the one, fifth lens L5 formed as a plane-concave lens whose concave surface is directed toward the image side. Meanwhile, in the example 1, a lens group A ($G_A$) is constituted by two groups, i.e. the second lens group $G_2$ and the third lens group $G_3$, as explained in the first embodiment. The first focal adjustment, in the most-distant observation state, is performed by simultaneously moving the second lens group $G_2$ (the fourth lens $L_4$) toward the object side and the third lens group $G_3$ (the fifth lend $L_5$) toward the image side along the optical axis from the respective positions in the most-distant observation state shown in the upper in FIG. 1 in a manner such that the respective moving paths are different from each other (no movement is made during the second focal adjustment).

In example 1, an aperture stop is provided in contact with the object-side surface of the fifth lens $L_5$ on the optical axis. The aperture stop 1 is structured to move together with the fifth lens $L_5$ during the first focal adjustment (no movement is made during second focal adjustment).

The fourth lens group $G_4$ is constituted by a sixth lens $L_6$ formed as a double-convex lens having an intense curvature in the object-side surface as compared to that in the image-side surface and a seventh lens $L_7$ formed as a negative meniscus lens whose concave surface is directed toward the image side.

The fifth lens group $G_5$ is constituted by one cemented lens that is made by joining together are an eighth lens $L_8$ formed by double-convex lens and a seventh lens $L_7$ formed by a negative meniscus lens whose concave surface is directed to the object sode. Meanwhile, as explained in the first embodiment, in the example 1, a lens group B ($G_B$) is constituted by only the fifth lens group $G_5$. The second focal adjustment, in a nearside magnifying observation state, is performed by moving the fifth lens group $G_5$ along the optical axis from a position in the intermediate observation state shown in the middle in FIG. 1 (no movement is made during the first focal adjustment).

Incidentally, the second focal adjustment can be structurally done by manually moving the fifth lens group $G_5$. However, it is possible to provide an auto-focus mechanism for automating the second focal adjustment. Such an auto-focus mechanism can be structured, for embodiment, by a drive mechanism for moving the fifth lens group $G_5$ along the optical axis and control means for controlling the drive mechanism depending upon a piece of information (image information formed on the CCD device, distance information of from an endoscope tip to a subject-of-observation). This is the same as for examples 2 to 4 shown in the below.

Table 1 shows, in the upper thereof, the values of a radius of curvature R of each lens, a center thickness of each lens, an air spacing D between lenses (hereinafter, referred to as "surface-to-surface axial spacing"), a refractive index $N_d$ at d-line of each lens, and an Abbe number vd at the d-line of each lens, of the endoscopic objective lens according to example 1. Note that, in Table 1 and in the following tables 2 to 4, the radius of curvature R and the surface-to-surface axial spacing D are in values the focal length in the most-distant observation state is normalized as 1.0 wherein the numbers put corresponding to the symbols are provided increasing gradually away from the object.

In the lower of Table 1, there are shown a distance to the object (normalized similarly to the surface-to-surface axial spacing D, which is true for those of the following Tables 2 to 4), a magnification and a variable group-to-group spacing 1 to 5 of surface-to-surface axial spacing D, in the states of most-distant observation, intermediate observation and nearest observation in example 1. It is apparent from this that the endoscopic objective lens in the example 1 has a smaller change of observing magnification upon focal adjustment in the nearside magnifying observation state, wherein focal adjustment is easy to perform.

TABLE 1

| | Radius-of-curvature R | Spacing D | Refractive index $N_d$ | Abbe number $v_d$ |
|---|---|---|---|---|
| 1 | ∞ | 0.3057 | 1.88300 | 40.9 |
| 2 | 0.8064 | 0.7644 | | |
| 3 | −9.8211 | 0.2675 | 1.83400 | 37.2 |
| 4 | 1.2184 | 0.9019 | 1.48749 | 70.2 |
| 5 | −1.4530 | 0.8079 | | |
| | | (variable 1) | | |
| 6 | 2.8778 | 0.6497 | 1.57135 | 53.0 |
| 7 | −1.9766 | 0.1911 | | |
| | | (variable 2) | | |
| 8 | ∞ | 0.2293 | 1.88300 | 40.9 |
| 9 | 1.5249 | 0.0413 | | |
| 10 | ∞ | 0.6345 | (Aperture stop) | |
| | | (variable 3) | | |
| 11 | 1.5249 | 0.5733 | 1.58144 | 40.7 |
| 12 | −9.4252 | 0.0764 | | |
| 13 | 1.7037 | 0.3057 | 1.83481 | 42.7 |
| 14 | 1.0563 | 0.5763 | | |
| | | (variable 4) | | |
| 15 | 1.2184 | 1.0930 | 1.48749 | 70.2 |
| 16 | −1.0563 | 0.2675 | 1.84666 | 23.8 |
| 17 | −4.8651 | 0.6879 | | |
| | | (variable 5) | | |
| 18 | ∞ | 2.1402 | 1.55920 | 53.9 |
| 19 | ∞ | 0.0382 | | |
| 20 | ∞ | 0.2293 | 1.51633 | 64.1 |
| 21 | ∞ | | | |

Most-distant point   Intermediate point   Nearest point

TABLE 1-continued

| Distance to object | 10.9302 | 3.2103 | 1.7580 |
|---|---|---|---|
| Magnification | −0.0864 | −0.4054 | −0.6816 |
| Variable 1 | 0.8079 | 0.2405 | 0.2405 |
| Variable 2 | 0.1911 | 1.1258 | 1.1258 |
| Variable 3 | 0.6345 | 0.2672 | 0.2672 |
| Variable 4 | 0.5763 | 0.5763 | 0.1758 |
| Variable 5 | 0.6879 | 0.6879 | 1.0884 |

Example 2

FIG. 2 shows a basic arrangement of an endoscopic objective lens according to an example 2, in the states of most-distant observation, intermediate observation and nearest observation.

The endoscopic objective lens in example 2 includes, in order from the object side, a first lens group $G_1$ having a negative refractive power and being fixed, a second lens group $G_2$ having a positive refractive power and movable along the optical axis, a third lens group $G_3$ having a negative refractive power and movable along the optical axis, a fourth lens group $G_4$ having a positive refractive power and being fixed, and a fifth lens group $G_5$ having a positive refractive power and movable along the optical axis, similarly to those of the example 1.

The first, second and third lens groups $G_1$, $G_2$, $G_3$ are structured similarly to those of the example 1. However, an aperture stop 1 is arranged between the second lens group $G_2$ and the third lens group $G_3$. Meanwhile, the present example is similar to the example 1 in that a lens group C ($G_C$) is constituted by the first lens group $G_1$ while a lens group A ($G_A$) is constituted by two lens groups of the second and third lens groups $G_2$, $G_3$. The lens movement in the first focal adjustment is similar to that in the example 1. However, the aperture stop 1 is not to move during the first focal adjustment (not moved during the second focal adjustment).

The fourth lens group $G_4$ is constituted by a sixth lens $L_6$ formed by a double-convex lens, a seventh lens $L_7$ formed by a double-convex lens having an intense curvature in the image-side surface as compared to the object-side surface, and an eighth lens $L_8$ formed by a double-concave lens having an intense curvature in the object-side surface as compared to the image-side surface. The seventh lens $L_7$ and the eighth lens $L_8$ are joined with each other.

The fifth lens group $G_5$ is structured as one cemented lens that is made by joining together a ninth lens $L_9$ formed by a double-convex lens and a tenth lens $L_{10}$ formed by a plane-concave lens whose concave surface is directed toward the object side. Incidentally, the lens group B ($G_B$) is constituted by only the fifth lens $G_5$, similarly to the example 1. The lens movement in the second focal adjustment is also similar to that in the example 1.

Table 2 shows, in the upper thereof, the values of a radius of curvature R of each lens, a surface-to-surface axial spacing D, a refractive index $N_d$ at the d-line of each lens, and an Abbe number $v_d$ at the d-line of each lens, of the endoscopic objective lens according to the example 2.

In the lower of Table 2, there are shown the values of a distance to the object, a magnification and a variable group-to-group spacing 1 to 5 of surface-to-surface axial spacing D, in the states of most-distant observation, intermediate observation and nearest observation in example 2. It is apparent from this that the endoscopic objective lens in the example 2 has a smaller change of observing magnification upon focal adjustment in the nearside magnifying observation state, and hence focal adjustment is easy to perform.

TABLE 2

| | Radius-of-curvature R | Spacing D | Refractive index $N_d$ | Abbe number $v_d$ |
|---|---|---|---|---|
| 1 | ∞ | 0.3024 | 1.88300 | 40.8 |
| 2 | 0.7806 | 1.0011 | | |
| 3 | −4.0791 | 0.2646 | 1.88300 | 40.8 |
| 4 | 0.9499 | 0.7257 | 1.53172 | 48.9 |
| 5 | −1.1705 | 0.7889 | | |
| | | (Variable 1) | | |
| 6 | 4.5575 | 0.4914 | 1.48749 | 70.2 |
| 7 | −1.4772 | 0.1888 | | |
| | | (Variable 2) | | |
| 8 | ∞ | 0.1134 | (Aperture stop) | |
| | | (variable 3) | | |
| 9 | ∞ | 0.2268 | 1.88300 | 40.8 |
| 10 | 1.7636 | 1.0071 | | |
| | | (variable 4) | | |
| 11 | 1.7477 | 0.7560 | 1.438750 | 95 |
| 12 | −2.4155 | 0.0756 | | |
| 13 | 2.8472 | 0.8996 | 1.67270 | 32.1 |
| 14 | −1.0280 | 0.2646 | 1.88300 | 40.8 |
| 15 | 2.1495 | 0.5262 | | |
| | | (variable 5) | | |
| 16 | 1.6657 | 0.9903 | 1.60300 | 65.5 |
| 17 | −1.6660 | 0.2646 | 1.84666 | 23.8 |
| 18 | ∞ | 0.6804 | | |
| | | (variable 6) | | |
| 19 | ∞ | 2.1167 | 1.55920 | 53.9 |
| 20 | ∞ | 0.0378 | | |
| 21 | ∞ | 0.2268 | 1.51633 | 64.1 |
| 22 | ∞ | | | |

| | Most-distant point | Intermediate point | Nearest point |
|---|---|---|---|
| Distance to object | 10.8102 | 3.02383 | 1.6253 |
| Magnification | −0.0873 | −0.4347 | −0.7319 |
| Variable 1 | 0.7889 | 0.4292 | 0.4292 |
| Variable 2 | 0.1888 | 0.5485 | 0.5485 |
| Variable 3 | 0.1134 | 0.8137 | 0.8137 |
| Variable 4 | 1.0071 | 0.3068 | 0.3068 |
| Variable 5 | 0.5262 | 0.5262 | 0.0782 |
| Variable 6 | 0.6804 | 0.6804 | 1.1284 |

Example 3

An endoscopic objective lens according to example 3 is structured similarly to that of the example 2 (however, the sixth lens $L_6$ thereof is made aspheric at both surface, as shown in the Table 3 given below). The lens movement in the first and second focal adjustment is similar to that in the example 2. For this reason, there is omitted of showing the basic arrangement of the endoscopic objective lens in the example 2, in the states of most-distant observation, intermediate observation and nearest observation.

Table 3 shows, in the upper thereof, the values of a radius of curvature R of each lens, a surface-to-surface axial spacing D, a refractive index $N_d$ at the d-line of each lens, and an Abbe number $v_d$ at the d-line of each lens, of the endoscopic objective lens according to example 3.

In the middle of Table 3, there are shown the values of a distance to the object, a magnification and a variable group-to-group spacing 1 to 6 of surface-to-surface axial spacing D, in the states of most-distant observation, intermediate observation and nearest observation in example 3. It is apparent from this that the endoscopic objective lens in example 3 has a smaller change of observing magnification upon focal adjustment in the nearside magnifying observation state, wherein focal adjustment is easy to perform.

Incidentally, in Table 3 and in the ensuing Table 4, the surface with the mark "*" attached in the left of the surface number is made as an aspheric surface whose shape is defined by the following aspheric-surface formula. In Table 3 and in the ensuing Table 4, the radius-of-curvature of the aspheric surface is represented as a value of radius-of-curvature R on the optical axis in each of the tables. In the counterpart lens arrangement figure, the extensions include those not necessarily drawn from the intersection with the optical axis, for the sake of easier viewing of the figures.

In the lower of Table 3, there are shown the values of constants K, $A_4$, $A_6$ and $A_8$ corresponding to the spherical surfaces.

TABLE 3

| | Radius-of-curvature R | Spacing D | Refractive index $N_d$ | Abbe number $v_d$ |
|---|---|---|---|---|
| 1 | ∞ | 0.2989 | 1.88300 | 40.8 |
| 2 | 0.7807 | 1.0028 | | |
| 3 | −4.1039 | 0.2615 | 1.88300 | 40.8 |
| 4 | 0.9127 | 0.7174 | 1.53172 | 48.9 |
| 5 | −1.3021 | 0.7322 (Variable 1) | | |
| 6 | 3.2132 | 0.4857 | 1.48749 | 70.2 |
| 7 | −1.4993 | 0.1867 (Variable 2) | | |
| 8 | ∞ | 0.1121 (variable 3) | (Aperture stop) | |
| 9 | ∞ | 0.2242 | 1.88300 | 40.8 |
| 10 | 1.8768 | 1.0764 (variable 4) | | |
| *11 | 1.7583 | 0.7473 | 1.43425 | 95 |
| *12 | −2.4348 | 0.0747 | | |
| 13 | 2.7944 | 0.8892 | 1.67270 | 32.1 |
| 14 | −0.9632 | 0.2615 | 1.88300 | 40.8 |
| 15 | 2.0152 | 0.5203 (variable 5) | | |
| 16 | 1.6057 | 0.9789 | 1.60300 | 65.5 |
| 17 | −1.5765 | 0.2615 | 1.84666 | 23.8 |
| 18 | −2687.0228 | 0.6725 (variable 6) | | |
| 19 | ∞ | 2.0923 | 1.55920 | 53.9 |
| 20 | ∞ | 0.0375 | | |
| 21 | ∞ | 0.2242 | 1.51633 | 64.1 |
| 22 | ∞ | | | |

| | Most-distant point | Intermediate point | Nearest point |
|---|---|---|---|
| Distance to object | 10.6858 | 2.9890 | 1.6066 |
| Magnification | −0.0884 | −0.4342 | −0.7334 |
| Variable 1 | 0.7322 | 0.4382 | 0.4382 |
| Variable 2 | 0.1867 | 0.4807 | 0.4807 |
| Variable 3 | 0.1121 | 0.8827 | 0.8827 |
| Variable 4 | 1.0764 | 0.3058 | 0.3058 |
| Variable 5 | 0.5203 | 0.5203 | 0.0776 |
| Variable 6 | 0.6725 | 0.6725 | 1.1152 |

| | Aspheric surface coefficient | | | |
|---|---|---|---|---|
| | K | $A_4$ | $A_6$ | A8 |
| 11 | 0.9998 | $-6.9088 \times 10^{-2}$ | $6.6822 \times 10^{-2}$ | $-1.1525 \times 10^{-1}$ |
| 12 | 1.0001 | $-6.7675 \times 10^{-2}$ | $3.8385 \times 10^{-2}$ | $-1.0546 \times 10^{-1}$ |

*Aspheric surface

Aspheric-Surface Formula:

$$Z = \frac{Y^2/R}{1+\sqrt{1-K \times Y^2/R^2}} + \sum_{i=2}^{4} A_{2i} Y^{2i}$$

where

Z: a length of a vertical line drawn from a point on an aspheric surface distant Y from the optical axis onto a tangential plane at the aspheric point (plane vertical to the optical axis), Y: a distance from the optical axis R: a radius of curvature of the aspheric surface at a point close to the optical axis, K: the eccentricity, $A_{2i}$: an aspheric surface coefficient (i=2-4)

Example 4

FIG. 3 shows a basic arrangement of an endoscopic objective lens according to an example 4, in the states of most-distant observation, intermediate observation and nearest observation.

The endoscopic objective lens in example 4 includes, in order from the object side, a first lens group $G_1$ having a negative refractive power and being fixed, a second lens group $G_2$ having a positive refractive power and being fixed, a third lens group $G_3$ having a negative refractive power and movable along the optical axis, a fourth lens group $G_4$ having a positive refractive power and being fixed, and a fifth lens group $G_5$ having a positive refractive power and movable along the optical axis, as explained in the second embodiment.

The first lens group $G_1$ is constituted by a first lens $L_{10}$ formed by a plane-concave lens whose concave plane is directed toward the image side, a second lens $L_2$ formed by a negative meniscus lens whose concave surface is directed toward the image side, and a third lens $L_3$ formed by a double-convex lens. The second lens $L_2$ and the third lens $L_3$ are joined with each other.

The second lens group $G_2$ is constituted by only the fourth lens $L_4$ formed by a double-convex lens having an intense curvature in the image-side surface as compared to that of the object-side surface. The third lens group $G_3$ is constituted by only the fifth lens $L_5$ formed by a plane-concave lens whose concave surface is directed toward the image. Meanwhile, as explained in the second embodiment, in the example 4, a lens group C ($G_C$) is constituted by the first and second lens groups $G_1$, $G_2$, while a lens group A ($G_A$) is constituted by only the third lens group $G_3$. The first focal adjustment, in a distant observation state, is performed by moving the third lens group $G_3$ (fifth lens $L_5$) along the optical axis toward the image from a position in the most-distant observation state shown in the upper in FIG. 3 (no movement is made in the second focal adjustment). As explained in the second embodiment, in the example 4, a fixed aperture stop 1 is arranged between the second lens group $G_2$ and the third lens group $G_3$.

The fourth lens group $G_4$ is constituted by a sixth lens $L_6$ made aspheric at both surfaces and having a positive refractive power, a seventh lens $L_7$ formed by a double-convex lens having an intense curvature in the image-side surface as compared to that of the object-side surface, and an eighth lens $L_8$ formed by a double-concave lens having an intense curvature in the object-side surface as compared to that of the image-side surface. The seventh lens $L_7$ and the eighth lens $L_8$ are joined with each other.

The fifth lens group $G_5$ is constituted by one cemented lens that joined together are a ninth lens $L_9$ formed by a double-convex lens and a tenth lens $L_{10}$ formed by a plane-concave lens whose concave surface is directed toward the object. As explained in the second embodiment, in the example 4, a lens group B ($G_B$) is constituted by only the fifth lens group $G_5$. The second focal adjustment is performed by moving the fifth lens group $G_5$ along the optical axis toward the object side from a position in the intermediate observation state shown in the middle in FIG. 3 (no movement is made during the first focal adjustment).

Table 4 shows, in the upper thereof, the values of a radius of curvature R of each lens, a surface-to-surface axial spacing D, a refractive index $N_d$ at the d-line of each lens, and an Abbe number $v_d$ at the d-line of each lens, of the endoscopic objective lens according to the example 4.

In the middle of Table 4, there are shown the values of a distance to the object, a magnification and a variable group-to-group spacing 1 to 4 of surface-to-surface axial spacing D, in the states of most-distant observation, intermediate observation and nearest observation in example 4. It is apparent from this that the endoscopic objective lens in example 4 has a smaller change of observing magnification upon focal adjustment in the nearside magnifying observation state, wherein focal adjustment is easy to perform.

Furthermore, in the lower of Table 4, there are shown the values of constants K, $A_4$, $A_6$ and $A_8$ corresponding to the spherical surfaces.

TABLE 4

| | Radius-of-curvature R | Spacing D | Refractive index $N_d$ | Abbe number $v_d$ |
|---|---|---|---|---|
| 1 | ∞ | 0.2725 | 1.88300 | 40.8 |
| 2 | 0.6916 | 0.9810 | | |
| 3 | 4.3863 | 0.2385 | 1.83481 | 42.7 |
| 4 | 0.8598 | 0.6541 | 1.48749 | 70.2 |
| 5 | −1.8000 | 0.6675 | | |
| 6 | 5.2687 | 0.4429 | 1.48749 | 70.2 |
| 7 | −1.3362 | 0.1703 | | |
| 8 | ∞ | 0.1022 | (Aperture stop) | |
| | | (variable 1) | | |
| 9 | ∞ | 0.2044 | 1.88300 | 40.8 |
| 10 | 2.0063 | 1.1709 | | |
| | | (variable 2) | | |
| *11 | 1.3925 | 0.6813 | 1.43425 | 95 |
| *12 | 26.1064 | 0.0681 | | |
| 13 | 1.6512 | 0.8108 | 1.63980 | 34.5 |
| 14 | −0.8347 | 0.2385 | 1.88300 | 40.8 |
| 15 | 2.3662 | 0.4612 | | |
| | | (variable 3) | | |
| 16 | 1.3748 | 0.8926 | 1.56907 | 71.3 |
| 17 | −1.4637 | 0.2385 | 1.84666 | 23.8 |
| 18 | ∞ | 0.6132 | | |
| | | (variable 4) | | |
| 19 | ∞ | 1.9077 | 1.55920 | 53.9 |
| 20 | ∞ | 0.0341 | | |
| 21 | ∞ | 0.2044 | 1.51633 | 64.1 |
| 22 | ∞ | | | |

| | Most-distant point | Intermediate point | Nearest point |
|---|---|---|---|
| Distance to object | 9.7431 | 2.7253 | 1.4649 |
| Magnification | −0.0970 | −0.4262 | −0.7115 |
| Variable 1 | 0.1022 | 0.9801 | 0.9801 |
| Variable 2 | 1.1709 | 0.2930 | 0.2930 |
| Variable 3 | 0.4612 | 0.4612 | 0.0706 |
| Variable 4 | 0.6132 | 0.6132 | 1.0038 |

| Aspheric surface coefficient | | | |
|---|---|---|---|
| K | $A_4$ | $A_6$ | $A_8$ |
| 11 | 0.9983 | −3.9683 × 10⁻² | 1.8236 × 10⁻¹ | −6.4698 × 10⁻² |
| 12 | 1.0001 | −3.4127 × 10⁻² | 1.1702 × 10⁻¹ | −1.0082 × 10⁻¹ |

*aspheric surface

Table 5 shows the values corresponding to the conditional expressions (1) to (5) for examples 1 to 4. Examples 1 to 4 each satisfy all the corresponding conditional expressions (1) to (5).

TABLE 5

| | Example 1 | Example 2 | Example 3 | Example 4 |
|---|---|---|---|---|
| Conditional expression (1), (3) | 1.47 | 1.48 | 1.46 | 1.32 |
| Conditional expression (2) | 0.98 | 0.96 | 0.96 | 0.97 |
| Conditional expression (4) | 7.69 | 8.89 | 8.83 | 8.30 |
| Conditional expression (5) | 4.18 | 4.44 | 4.51 | 5.34 |

FIGS. 4 to 7 show aberrations (spherical aberration, astigmatism, distortion and lateral color) on examples 1 to 4, in the most-distant observation, intermediate observation and nearest observation states. In the aberration diagram, ω represents a half angle of view. As shown in FIGS. 4 to 7, the foregoing aberrations can be all provided preferable by each of examples 1 to 4.

Incidentally, the endoscopic objective lens in the invention is not limited to the foregoing examples but can be changed to various modifications. For embodiment, radius-of-curvature R and surface-to-surface axial spacing D can be suitably changed for the lenses.

Meanwhile, the endoscopic objective lens in the embodiment was structured not overlapped between the lenses making up the lens group A ($G_A$) and the lenses making up the lens group B ($G_B$). However, the lenses, making up the lens group A ($G_A$), can be provided constituting a part or the whole of the lens group B ($G_B$) or the lenses, making up the lens group B ($G_B$), can be provided constituting a part or the whole of the lens group A ($G_A$).

Meanwhile, aspheric surfaces, GRIN lenses or diffraction gratings can be added to or substituted in the endoscopic objective lens in each of the examples, thereby correcting for chromatic aberration or other aberrations.

While the invention has been described with reference to the exemplary embodiments, the technical scope of the invention is not restricted to the description of the exemplary embodiments. It is apparent to the skilled in the art that various changes or improvements can be made. It is apparent from the description of claims that the changed or improved configurations can also be included in the technical scope of the invention.

This application claims foreign priority from Japanese Patent Application No. 2005-347817, filed Dec. 1, 2005, the entire disclosure of which is herein incorporated by reference.

What is claimed is:

1. An objective lens for an endoscope, comprising a lens group A and a lens group B that are movable in a direction of an optical axis,
wherein
first focal adjustment for observing a point between a most-distant point and an intermediate point is performed by moving the lens group A from a lens arrangement for observing the most-distant point;
second focal adjustment for observing a point between the intermediate point to a nearest point is performed by moving the lens group B from a lens arrangement for observing the intermediate point; and
the objective lens satisfies conditional expressions (1) and (2):

$$1.2 < f_M/f_F \tag{1}$$

$$0.9 < |f_N/f_M| < 1.1 \tag{2}$$

wherein
$f_M$ represents a focal length of the objective lens in observing the intermediate point, $f_F$ represents a focal length of the objective lens in observing the most-distant point, and $f_N$ represents a focal length of the objective lens in observing the nearest point.

2. The objective lens according to claim 1, wherein a lens constituting the lens group A and a lens constituting the lens group B do not overlap each other.

3. The objective lens according to claim 2, wherein the lens group B consists of a cemented lens.

4. The objective lens according to claim 2, wherein the lens group A consists of one group.

5. The objective lens according to claim 1, further comprising a lens group C in a position closest to an object, the lens group C being fixed during the first and second focal adjustments, wherein the objective lens satisfies conditional expressions (3) to (5) below:

$$1.2 < f_M/f_F < 2.5 \quad (3)$$

$$4.0 < DF/f_F < 15.0 \quad (4)$$

$$2.0 < |\beta_{CN}/\beta_{CF}| < 8.0 \quad (5)$$

wherein $D_F$ represents an entire length of the objective lens in observing the most-distant point, $\beta_{CN}$ represents a magnification of the lens group C in observing the nearest point, and $\beta_{CF}$ represents a magnification of the lens group C in observing the most-distant point.

6. The objective lens according to claim 1, comprising: in order from an object side of the objective lens, a first lens group having a negative refractive power; a second lens group having a positive refractive power; a third lens group having a negative refractive power; a fourth lens group having a positive refractive power; and a fifth lens group having a positive refractive power, wherein the lens group A consists of the third lens group, and the lens group B consists of the fifth lens group.

* * * * *